United States Patent Office 2,696,489
Patented Dec. 7, 1954

2,696,489

DEHYDRATION OF MALEIC ACID

James F. Adams, St. Louis, and Ferdinand B. Zienty, Brentwood, Mo., assignors to Monsanto Chemical Company, St. Louis, Mo., a corporation of Delaware No Drawing. Application June 16, 1953,
Serial No. 362,138

13 Claims. (Cl. 260—346.8)

This invention relates to the process of converting maleic acid to maleic anhydride.

This application is a continuation-in-part of our application Ser. No. 102,167, filed June 29, 1949, now abandoned.

Various methods have been proposed for the conversion of maleic acid to maleic anhydride. However, prior methods have been subject to various objections including expensive operation and undesired by-products, for example, the production of excessive amounts of fumaric acid, tarry materials, etc.

In particular, the conversion into maleic anhydride of the maleic acid contained in aqueous solutions thereof has presented serious problems. For example, it has previously been considered necessary to separate solid maleic acid from the solutions as a preliminary step. This has added a significant element of cost to the manufacture of the maleic anhydride. Furthermore, attempts to utilize aqueous solutions of maleic acid in the preparation of maleic anhydride have been disappointing in that excessive amounts of maleic acid are converted into fumaric acid.

It is an object of this invention to provide a new method for the conversion of maleic acid to maleic anhydride. A particular object of this invention is to provide an inexpensive method for treating aqueous solutions of maleic acid so as to recover at least a substantial proportion of the maleic content thereof in the form of maleic anhydride.

According to the present invention, maleic acid contained in an aqueous solution thereof or in an aqueous slurry is recovered in the form of maleic anhydride by a process which comprises passing the aqueous composition into a pool of maleic anhydride, boiling under reflux conditions and removing the evolved water vapor. More specifically, the process of this invention comprises passing an aqueous maleic acid composition into a molten pool of maleic anhydride heated substantially to its boiling point at the pressure at which the process is carried out, heating the resulting mixture at its reflux temperature, maintaining specific reflux conditions during the feeding of the aqueous maleic acid composition, condensing the maleic anhydride from the vapor above the boiling pool in a partial condenser and permitting the water vapor to pass through said condenser.

The new process of this invention possesses numerous advantages over prior methods for converting maleic acid in aqueous solutions thereof into maleic anhydride. By operating according to the present invention, it is not necessary to go through the preliminary step of separating solid maleic acid from aqueous solutions thereof. Instead, both the water of solution and water of dehydration are simultaneously removed. Another important and unique feature of the process of the invention is that there is little or no conversion of maleic acid to fumaric acid and other undesired by-products as might be expected. This is very surprising since heating maleic acid in the presence of water is generally considered to promote the isomerization of maleic acid to fumaric acid.

In carrying out the processes of the invention the concentration of maleic acid in the aqueous feed solution may be varied within substantial limits. However, partly for purposes of economy, it is desirable that the maleic acid concentration be at least 40% and preferably 60–80%. When the process is employed in conjunction with the preparation of maleic anhydride by the oxidation of such hydrocarbons as benzene, the concentration of the feed solution may be readily adjusted by passing the gaseous oxidation products into water until the desired concentration of maleic acid is achieved.

In addition to the dissolved maleic acid, the feed compositions may contain solid maleic acid suspended in solutions thereof, i. e., aqueous slurries containing solid maleic acid suspended in aqueous solutions thereof. However, the amount of suspended maleic acid is preferably such that the aqueous mixture is still readily flowable at the selected temperature. Maleic acid solution containing 80% by weight dissolved maleic acid and containing 50% by weight of suspended solid maleic acid, i. e., 130 parts by weight of maleic acid for each 20 parts by weight of water, is flowable at 105° C.

The temperature of the maleic acid feed solution may be substantially varied. However, temperatures of over 100 105° C. are to be avoided if the solution or slurry is to be held at such temperatures for a prolonged period of time, e. g., one-half hour or more, because fumaric acid will form when the aqueous feed solution is held longer at temperatures in excess of 105° C.

The temperature of the pool of boiling maleic anhydride may be varied to a considerable extent. Temperatures of 125–185° C. are preferred and it is found that the efficiency of the process drops off rapidly if appreciably lower temperatures are employed and processing difficulties tend to arise at higher temperatures. An even more preferred range of temperatures is 135–160° C. The pressure maintained within the reaction equipment is such as to cause the maleic anhydride to boil at the selected temperature. This result is accomplished by placing the system under a partial vacuum when temperatures below the boiling point of maleic anhydride at atmospheric pressure are used.

By maintaining the pool of boiling maleic anhydride at 125–185° C. and a correspondingly reduced pressure, high yields and exceptional ease of operation result. However, the process may be carried out effectively at higher temperatures, i. e., corresponding to pressures of 760 mm. of mercury and above. While such higher temperatures are not generally preferred, the results are rendered unexpectedly good by employing the other features of the invention.

The temperature of the partial condenser is such as to cause all or substantially all of the maleic anhydride vapors to condense and be returned to the boiling pool of maleic anhydride or to a separate collector while at the same time permitting the escape of water vapors. This is accomplished by circulating a heat exchange medium at a suitable temperature through the reflux condenser. Water is entirely satisfactory for this purpose but may be replaced if desired by other fluids, or other cooling methods may be used. In general, it is found that efficient operation is achieved by maintaining the reflux condenser at an average temperature of 65–100° C. If lower temperatures are employed, an excessive amount of heat is abstracted from the boiling pool of maleic anhydride and there is also the danger of condensing an appreciable amount of water, and of causing maleic anhydride to solidify, which obviously must be avoided. If higher temperatures are employed, an appreciable amount of maleic anhydride may not be retained by the condenser and is lost or condensed with the water vapor in a subsequent total condenser. The precise temperature maintained in the partial condenser is determined by the partial pressure under which the system is maintained, and this is in turn determined by the temperature selected for the pool of boiling maleic anhydride. In any event, the temperature at which the condenser is maintained is in the range where there is a maximum retention of maleic anhydride with a minimum retention of water.

While the average temperature of the cooling fluid is preferably that given above, it is to be understood that there may be some spread in temperature from the inlet to the outlet of the condenser, for example 5–20° C. or more. The circulating fluid enters the condenser at a temperature below the desired average temperature, e. g., 2–10° C. or more and leaves the condenser at a higher temperature, e. g., 2–10° C. or more above the average temperature.

A particularly wide temperature spread may be desired if the initial temperature of the circulating fluid is low, to avoid solidification of the maleic component of the condensate. For example, an outlet temperature of at least 70° C. is desirable if the inlet temperature is as low as 45° C. The temperature spread may be controlled in various ways, e. g., heat capacity of the circulating fluid, rate of circulation, application of external heat, insulation of the condenser, use of a cooling liquid boiling at the selected temperature, etc.

The rate at which the aqueous solution of maleic acid is fed into the boiling pool of maleic anhydride is determined at least in part by the amount of maleic anhydride in the pool which in turn is determined by the size of the specific equipment employed. The maximum rate of feed should be such that there is not an appreciable accumulation of water and/or undehydrated maleic acid in the maleic anhydride pool as indicated hereinbefore. The maximum rate of feed is also determined in part by the rate at which heat may be transferred to the pool of boiling maleic anhydride. If the aqueous feed composition is fed in too rapidly the temperature of the maleic anhydride will tend to drop below the selected temperature. Thus the rate of feed of the aqueous solution is correlated with the rate at which heat is supplied to the pool of maleic anhydride to maintain the latter in a boiling condition at the selected temperature and pressure.

The aqueous maleic acid composition may be fed into the reaction vessel either continuously or intermittently. In general, smoother operation and higher yields are achieved if the feed is continuous.

In carrying out the process of the invention, the maleic acid solution is preferably fed into the pool of boiling maleic anhydride by passing the solution through a feed pipe which terminates under the surface of the boiling pool. However, if desired, the feed pipe may terminate above the boiling pool if care is taken to prevent the liquid from splashing into and plugging the feed line opening by dehydration to solid material.

The water which flashes off from the boiling maleic anhydride is not retained by the partial condenser during reflux but passes off out of the top of the condenser. This water may be allowed to pass off through the vacuum system when desirable or it may be condensed in a cool downward, or total, condenser, collected to recover as maleic acid any maleic anhydride which passed through the partial condenser, and saved for later processing.

In the operation of the process of the invention, the water is rapidly removed from the boiling pool of maleic anhydride to avoid deleterious results, particularly formation of fumaric acid. Thus, the boiling pool should be close to anhydrous conditions so that the amount of water present as such and in combined form, e. g., combined with maleic anhydride in the form of maleic acid, is at a low value.

When the aqueous maleic acid feed is added intermittently, each increment should be of such size that substantially anhydrous conditions are restored in not over 1 minute and preferably within 10–20 seconds in order to avoid deleterious side reactions. By substantially anhydrous conditions it is meant that not over 15%, and preferably not over 10%, of the contents of the pool are in a hydrated form, e.g., in the form of maleic acid. When the aqueous maleic acid feed is added continuously, the conditions should be such that not over a few percent, e. g., 15%, and preferably not over 10%, of the contents of the pool are in a hydrated form, e. g., in the form of maleic acid at any one time.

For the same reason the amount of water returned from the partial condenser should be kept at a minimum consistent with retention of a maximum amount of maleic anhydride. The deleterious effects of retaining water in this condenser must be balanced against the economic loss in allowing maleic anhydride to pass over and be condensed with the water or be lost from the system. The exact conditions under which the operations are carried out depend on economic considerations, as well as the degree of separation possible with the equipment employed.

Although the process of this invention is effective under a wide variety of conditions, there is a critical limit of operation for any particular condition of pressure or temperature selected for operation. The particular temperature or pressure of the system, rate of feed, rate of heating and other factors hereinbefore discussed are so correlated that the improved results obtained by the process of this invention are not achieved unless during feeding of the maleic acid and while reflux conditions are maintained, the maleic content, i. e., sum of the weights of the maleic anhydride and maleic acid, in the vapor above the boiling pool be at least twice the weight of the water in the vapor therein. The more preferred ratios are in the range 6:1–20:1. When operating under reflux conditions which produce over the pool a vapor having a maleic content to water ratio of 2:1 or above, it is found that the temperature spread between the boiling pool and the vapor above it is relatively low being in the range of only 5–10° C. At ratios below 2:1 it is found that large quantities of fumaric acid are formed. Ratios higher than 20:1 may be used but are not required for effective operation of the process of this invention.

Optimum results are achieved by carrying out the process of this invention at or above the 2:1 lower limit of the composition of the vapor in contact with the boiling pool as stated above. These conditions can be achieved by regulating the rate of addition of the aqueous maleic acid composition to the system so that the rate of input of maleic acid in the aqueous feed, on a dry basis, does not exceed about from 0.7 to 3.0 pounds per pound of water removed through the partial condenser. This range of ratios of maleic acid fed to water removed is the range of the upper limits for the use of aqueous maleic acid compositions varying from solutions containing from 40% to 80% by weight of maleic acid based on the aqueous solution, up to compositions comprising a flowable slurry containing up to about 50 parts of suspended maleic acid per 100 parts by weight of a saturated solution at 105° C. The range of the lower limits of rate of maleic acid fed to water removed for the preferred feed compositions which provides best results is from about 0.6 to about 2.5. When the ratio of maleic acid fed to water removed exceeds the upper limits set forth above for the aqueous compositions specified, the formation of fumaric acid becomes excessive and will, of course, reach the point of causing the pool to become an unmanageable semi-solid to solid mass containing water, fumaric acid, maleic acid and maleic anhydride and defeat the purpose of the process of this invention.

The process of this invention can be carried out by feeding aqueous solutions containing less than 40% maleic acid by weight. For example, solutions containing 10% to 40% maleic acid by weight can be employed. However, the ratio of maleic acid fed to water removed would be very low, about 0.1 part of maleic acid per part of water, requiring the use of equipment that would not be as practical for an industrial process as would that used with the more concentrated aqueous feed compositions.

Thus, for practical industrial operation the process of this invention comprises passing an aqueous maleic acid composition containing from 40 to about 90 parts of maleic acid per 100 parts of said aqueous composition into molten refluxing maleic anhydride; i. e., a pool of maleic anhydride heated substantially to its boiling point at the pressure at which the process is carried out, maintaining the resulting mixture at its reflux temperature during the feeding of the aqueous maleic acid compositions, condensing the maleic anhydride from the evolved vapor in a partial condenser, and permitting the water vapor to pass through said condenser thereby removing substantially all of the water from the dehydration system, wherein in said process, during the feeding of the aqueous maleic acid composition, there is maintained in contact with said refluxing pool a vapor wherein the sum of the weights of maleic anhydride and maleic acid is at least twice the weight of the water therein by feeding the aqueous maleic acid compositions at such a rate as to provide from 0.6 to about 3.0 parts by weight of maleic acid fed per part of water removed from the process.

According to a preferred embodiment of the present invention, the operation of the process is carried out under reduced pressure. Preferably, absolute pressures corresponding to 100–400 mm. mercury are used to produce high yields of maleic anhydride. A still more preferred range of pressure is that corresponding to 175–225 mm. mercury.

The following examples will illustrate the process of this invention and the critical mode of operating thereof. In Examples I to III the maleic acid feed solution contained only dissolved substantially pure maleic acid. These examples are included to illustrate the process of this invention where there are present no impurities.

EXAMPLES I TO III 200 parts of maleic anhydride are placed in a suitable vessel equipped with an agitator, a means for supplying heat to the vessel and a means for maintaining a reduced pressure within the apparatus connected to a total condenser which is connected to a partial condenser which in turn is connected to the vessel. The maleic anhydride is then heated to the molten state and so maintained while the pressure in the apparatus is reduced to about 200 mm. Hg. A hot aqueous solution (80° C.) containing about 70% by weight of maleic acid is fed at a constant rate into the molten pool of maleic anhydride and the heat supplied to the pool is adjusted to maintain reflux conditions throughout the period of feeding the aqueous solution. The temperature of the inlet water to the partial condenser is adjusted to the proper temperature to prevent solidification of the maleic anhydride and/or acid therein and to assure a reflux return of liquid without substantial condensation of water vapors entering the partial condenser. The temperature of the total condenser is adjusted to about 10° C. to condense all of the water vapor plus some maleic values leaving the partial condenser.

At frequent intervals during operation, the liquid returning from the partial condenser to the pool is sampled to determine the amount returning to the pool and to determine its composition. After all the aqueous maleic acid solution has been fed, the system is returned to atmospheric pressure and the cold condensate (condensate from the total condenser) is removed for weighing and for analysis. The crude maleic anhydride in the dehydrating vessel is then dried and distilled under reduced pressure, about 20 to 30 mm. Hg, to separate it from any fumaric acid formed.

Tabulated below are the amounts of maleic acid solution fed into the dehydration system, the composition of the solution, the pool temperature during reflux, the vapor composition during reflux, the ratio of maleic acid fed to water removed on a weight basis, and the yields of maleic anhydride for three different operating conditions.

*Table I*

DEHYDRATION OF MALEIC ANHYDRIDE IN MALEIC ACID SOLUTIONS AT 200 MM. Hg

| | Example I | Example II | Example III |
|---|---|---|---|
| Quantity of maleic acid solution fed, grams | 673 | 603 | 644 |
| Percent by weight maleic acid | 73.8 | 71.6 | 71 |
| Pool temperature, °C | 125 | 135 | 145 |
| Ratio of parts of maleic acid fed per part of water removed | 2.50 | 2.08 | 1.94 |
| Vapor compositions, ratio weight of maleic anhydride to water | 0.97 | 1.4 | 4.5 |
| Percent maleic acid converted to anhydride | 79 | 91.6 | 95.8 |
| Percent maleic acid not converted (fumaric acid and tars) | 20.7 | 8.1 | 4.1 |

A plot of the weight ratio of maleic anhydride to water in the vapor against percent maleic acid converted shows that there is a sharp break at about 93% to 94% conversion of maleic acid to anhydride corresponding to the critical minimum ratio of 2 to 1. Likewise, a plot of this ratio of maleic acid fed to water removed against percent maleic acid converted to anhydride shows there is a sharp break corresponding to about 91% conversion at about 2 parts of maleic acid fed per part of water removed.

The following examples further illustrate the process of the invention but are not to be considered limitative of the scope thereof. Where parts are specified, they are parts by weight.

EXAMPLE IV

The process described in Examples I to III is repeated except that a concentrated crude maleic acid solution obtained from the aqueous scrubber in a system wherein maleic anhydride is produced by the controlled vapor phase catalytic oxidation of benzene and wherein the gaseous mixture from said catalytic oxidation is scrubbed with water in a water absorption system. The maleic acid content of the concentrated aqueous maleic acid solution is about 70% by weight and the temperature of the solution fed is about 80° C. During reflux conditions at 200 mm. Hg the pool temperature is about 155° C. and the temperature of the vapors above the pool is about 152° C. The weight ratio of maleic acid fed to water removed is 1.9 during the time the solution is fed and during reflux conditions.

By this process 93% of the maleic acid fed is converted to maleic anhydride. Because of the nature of the impurities in the crude solution fed, the amount of fumaric acid formed is difficult to determine.

When the above-described process is repeated with a weight ratio of maleic fed to water removed of 2.75, the maleic acid is not converted to maleic anhydride but rather is inverted to fumaric acid quite rapidly and the pool becomes a semi-solid unmanageable mass.

EXAMPLE V 200 parts of maleic anhydride are placed in a suitable vessel equipped with partial and total condensers, an agitator, means for maintaining a reduced pressure within the apparatus and means for supplying heat to the vessel, e. g., a heated bath, as described in Examples I to III. The maleic anhydride is then heated to approximately 145° C. and maintained at that temperature and at sufficiently reduced pressure to cause the maleic anhydride to boil, i. e., a pressure corresponding to about 200 mm. Hg. To the condenser there is fed inlet water at about 70° C. at such a rate as to maintain the exit water at a temperature at about 75° C. so that the maleic anhydride vapors from the boiling pool thereof are condensed and returned to the body of boiling maleic anhydride.

While maintaining the pool of boiling maleic anhydride under the conditions set forth above, a crude solution of maleic anhydride as described in Example IV containing 70% by weight of maleic acid at a temperature of 80° C. is gradually passed into the boiling maleic anhydride with stirring at the rate of 200 parts maleic acid per hour equivalent to 1.89 parts of maleic acid per part of water collected in the total condenser. As a result of this treatment the maleic acid is substantially instantaneously dehydrated to maleic anhydride and the water of dehydration is substantially instantaneously evaporated along with the water of solution from the pool of boiling maleic anhydride. The evolved water vapor is not retained by the reflux condenser under the pressure and temperature conditions maintained within the condenser and escapes from the top thereof.

After all of the maleic acid solution is added, the pressure within the system is reduced to 20–30 mm. Hg and the crude maleic anhydride is purified by distillation. It is found that a yield of 89.5% is obtained based on the theoretical amount of maleic anhydride recoverable from the crude maleic acid solution.

EXAMPLE VI

Example V is repeated except that the temperature of the pool of boiling maleic anhydride is maintained at 157° C., the maleic anhydride is caused to boil by reducing the pressure within the system to about 300 mm. Hg, the temperature of the reflux condenser is about 85° C., and the crude maleic acid solution at 100° C. is passed in at the rate of 150 parts of maleic acid per hour equivalent to about 1.8 parts maleic acid per part of water removed. A yield of maleic anhydride corresponding to 85.0% of the theoretical amount is obtained.

EXAMPLE VII

When Example V is repeated employing in place of the 70% feed solution a crude aqueous maleic acid solution containing 80% by weight of maleic acid at the rate of 130 parts of maleic acid per hour equivalent to about 3.2 parts of maleic acid per part of water removed, an 81.3% yield of maleic anhydride based on the maleic acid content of the feed solution is obtained. When the feed rate is equivalent to about 2.6 parts of maleic acid per pound of water removed, the yield of maleic anhydride will be about 91% or above.

EXAMPLE VIII

Example V is repeated except that the pool of boiling maleic anhydride is maintained at a temperature of 140° C. while establishing a pressure in the system corresponding to about 150 mm. Hg, the temperature of the reflux condenser is about 65° C., and the crude aqueous solution of maleic acid is fed in at a rate of 160 parts maleic acid per hour equivalent to about 2.1 parts of maleic acid per part of water removed.

The yield of purified maleic anhydride obtainable from this process will be from 84% to 88% of theory.

EXAMPLE IX

Example V is repeated except that the rate of feed of the maleic acid solution is increased to 270 parts maleic acid per hour, the average temperature of the partial condenser is about 71° C., and a larger capacity total condenser is employed so that a higher rate of heat input can be employed to provide a ratio of maleic acid fed to water removed of about 1.9. A yield of maleic anhydride of 88% is obtained.

EXAMPLE X

In this example, which otherwise is carried out as in the case of Example V, the rate of feed of the maleic acid is 1.7 parts maleic acid per part of water removed. The yield of maleic anhydride is 93%.

EXAMPLE XI

The process is repeated in a manner similar to that described in Example V except that a slurry of maleic acid in a crude aqueous solution thereof at 80° C. containing 20 parts of maleic acid per 100 parts of solution suspended in a saturated maleic acid solution (saturation at 80° C. is 73.9% by weight) is fed into the maleic anhydride pool at a rate of 2.4 parts of maleic acid per part of water removed. The reflux conditions are maintained at a pressure of 200 mm. Hg and a pool temperature of about 150° C.

The yield of purified maleic anhydride based on the maleic acid feed obtainable by the above modification of the process of this invention will be about 90%.

EXAMPLE XII

In this example, the dehydration of the maleic acid solution is initiated as in Examples I to III and a crude solution containing 80% of maleic acid by weight is fed. Thereafter, the refluxing liquid is withdrawn from the reflux (partial) condenser at such a rate as to maintain a substantially constant volume in the boiling pool instead of allowing all of the condensate to return to the pool of boiling maleic anhydride and the crude maleic acid solution is continuously added to the reaction vessel at the rate of about 2.7 parts of maleic acid per part of water removed while maintaining the vapor temperature at 145° C. and the pressure at about 200 mm. Hg.

The addition of the crude maleic acid solution is continued until the amount of maleic anhydride product withdrawn is several times the capacity of the reaction vessel. The maleic anhydride product is purified by fractional distillation. The yield of purified maleic anhydride based on the maleic acid in the feed is about 90% based on the maleic acid fed.

In contrast to the process of the invention, as illustrated by the foregoing examples, if this process is carried out at 200 mm. Hg while maintaining the vapor at 145° C. at a feed rate of about 3 parts of maleic acid per part of water removed, substantially all of the maleic acid fed is converted into fumaric acid because the minimum ratio of maleic anhydride to water in the vapor cannot be obtained and the pool solidifies. Thus, an unexpected aspect of the invention is the discovery that the use of the conditions hereinbefore specified is a critical factor in treating aqueous solutions of maleic acid to recover maleic anhydride therefrom.

Instead of carrying out the process by a batch method as set forth in Examples I to X, the process may be operated continuously as in Example XI by suitable adjustments in the equipment employed. In carrying out a continuous process it is necessary that an initial pool of maleic anhydride be provided. Thereafter, the size of this pool is maintained at the selected level by withdrawing from the reflux (partial) condenser, at a suitable location thereon, an amount of maleic anhydride such as to maintain the boiling pool at a desired level. Alternatively, this may be done by withdrawing molten material from the pool. Thus, once the various conditions of operation are established, for example, rate of feed of the maleic acid solution of desired concentration, temperature of the maleic anhydride pool, partial pressure in the system, temperature of the reflux condenser, rate of withdrawal of the maleic anhydride, the process may be continuously operated for extended periods of time. Certain by-products are usually obtained and with the exception of the small amount of product passing off with the water vapor make up the difference between the yield of maleic anhydride which is obtained and the theoretical amount. However, a certain amount of fumaric acid and tarry high boiling material from impurities in the crude aqueous maleic acid compositions is developed and if the maleic anhydride produced is withdrawn from the reflux (partial) condenser, it may be necessary, from time to time, to withdraw a certain portion of the pool of maleic anhydride in order that an excessive amount of these by-products is not accumulated in the pool. The material drawn off from the pool of maleic anhydride may be fractionally distilled to recover the useful components thereof.

What is claimed is:

1. A process for converting maleic acid to maleic anhydride which comprises feeding an aqueous maleic acid composition into a boiling pool of maleic anhydride maintained under reflux conditions and removing the water vapor from the vapors evolved from said pool, wherein the rate of feed of said aqueous composition is not greater than 3 parts of maleic acid per part of water removed.

2. A process for converting maleic acid to maleic anyhdride which comprises feeding an aqueous maleic acid composition into a boiling pool of maleic anhydride maintained under reflux conditions and removing the water vapor from the vapors evolved from said pool, wherein the rate of feed of said aqueous composition is not greater than 3 parts of maleic acid per part of water removed and there is above said pool a vapor composition wherein the sum of the weights of maleic anhydride and maleic acid is at least twice the weight of the water therein.

3. A process for converting maleic acid to maleic anhydride which comprises feeding an aqueous solution of maleic acid into a pool of refluxing maleic anhydride maintained at a temperature of 125°–185° C. and at a sufficiently reduced pressure to cause the maleic anhydride to boil and removing the water vapor from the vapors evolved therefrom, wherein said process the rate of feed of said aqueous solution is not greater than 3 parts of maleic acid per part of water removed and there is above said pool a vapor composition wherein the sum of the weights of maleic anhydride and maleic acid is at least twice the weight of the water therein.

4. A process as defined in claim 2 in which the maleic anhydride pool is maintained at a temperature of 135° to 165° C.

5. A process for converting maleic acid to maleic anhydride which comprises feeding an aqueous solution containing at least 40% maleic acid by weight at a temperature of not over 105° C. into a pool of refluxing maleic anhydride maintained at a temperature of 125°–185° C. and at a sufficienly reduced pressure to cause the maleic anhydride to boil and removing the water vapors from the vapors evolved therefrom, wherein said process the rate of feeding said maleic acid solution is from about 0.6 to about 3 parts of maleic acid per part of water removed and there is above said pool a vapor composition wherein the sum of the weights of maleic anhydride and maleic acid is at least twice the weight of the water therein.

6. A process as defined in claim 2 in which the maleic acid solution contains 60–80% maleic acid by weight, the temperature of the maleic anhydride pool is 135–160° C., and the rate of feed is from 1 to 3 parts of maleic acid per part of water removed.

7. A process for converting maleic acid to maleic anhydride which comprises feeding an aqueous solution of maleic acid containing 70% by weight of maleic acid at a temperature of 80–85° C. into a pool of refluxing maleic anhydride maintained at a temperature of 145–150° C. and an absolute pressure corresponding to 200 mm. Hg at a rate of from 1.7 to 2.0 parts of maleic acid per part of water removed from the vapors, provided by the reflux conditions which provides above said pool a vapor composition wherein the sum of the weights of maleic anhydride and maleic acid is at least twice the weight of the water therein, and removing the evolved water vapor.

8. A continuous process for converting maleic acid to maleic anhydride which comprises continuously feeding an aqueous solution of maleic acid containing at least 40% maleic acid by weight at the rate of from about 0.6 to 3.0 parts of maleic acid per part of water vapor removed from the vapors provided by the reflux conditions which provide above said pool a vapor composition wherein the sum of the weights of maleic anhydride and maleic acid is at least twice the weight of the water therein, continuously removing the water which is flashed off from the boiling maleic anhydride and continuously condensing maleic anhydride vapors at a temperature above the melting point thereof and continuously removing liquid maleic anhydride at such a rate as to maintain the boiling pool at a substantially constant level.

9. A continuous process for converting maleic acid to maleic anhydride which comprises continuously feeding an aqueous solution containing from 40% to 80% maleic acid by weight at a temperature of not over 105° C. into a pool of refluxing maleic anhydride maintained at a temperature of 125–185° C. and at a sufficiently reduced pressure to cause the maleic anhydride to boil, at a rate of from about 0.6 to about 3.0 parts of maleic acid per part of water vapor evolved from said pool which provides above said pool a vapor composition wherein the sum of the weights of maleic anhydride and maleic acid is at least twice the weight of the water therein, continuously removing the water which is flashed off from the boiling maleic anhydride, continuously condensing the maleic anhydride vapors at a temperature above the melting point thereof and continuously removing a portion of the pool of crude maleic anhydride at a rate substantially equivalent to the rate at which the crude maleic anhydride is produced.

10. A process as defined in claim 8 in which a portion of the pool of crude maleic anhydride is periodically drawn off so as to maintain the volume of the boiling pool within the desired average level.

11. A process as defined in claim 7 in which the maleic anhydride condensate is periodically drawn off in an amount insufficient to keep the boiling pool down to its original volume and periodically removing a sufficient amount of the pool to reduce the pool to its original level.

12. A process for converting maleic acid to maleic anhydride which comprises feeding an aqueous solution of maleic acid at a temperature not over 105° C. into a boiling pool of maleic anhydride maintained under reflux conditions and removing the water vapor from the vapors evolved therefrom, wherein the rate of feeding said aqueous solution is not in excess of 3 parts of maleic acid per part of water removed, which provide above said pool a vapor composition wherein the sum of the weights of maleic anhydride and maleic acid is at least twice the weight of the water therein.

13. A process as defined in claim 6 wherein the refluxing conditions provide above the maleic anhydride pool a vapor composition wherein the sum of the weight of maleic anhydride and maleic acid is at least six times the weight of the water therein.

References Cited in the file of this patent

UNITED STATES PATENTS

| Number | Name | Date |
|---|---|---|
| 2,205,402 | Foster et al. | June 25, 1940 |
| 2,340,490 | Porter | Feb. 1, 1944 |